Patented Aug. 19, 1924.

1,505,656

UNITED STATES PATENT OFFICE.

MARTIN L. MARTUS, OF WOODBURY, CONNECTICUT.

PRIMARY BATTERY.

No Drawing.   Application filed February 19, 1924.   Serial No. 693,896.

*To all whom it may concern:*

Be it known that I, MARTIN L. MARTUS, a citizen of the United States, residing at Woodbury, in the county of Litchfield and State of Connecticut, have invented certain new and useful Improvements in Primary Batteries, of which the following is a specification.

This invention relates to primary batteries; and it comprises a method of determining the exhaustion of primary batteries having a caustic alkali electrolyte wherein foreign substances are added to such electrolyte capable of indicating the progress of exhaustion by a visual indication, such as a change in color, a change in clearness or the formation of substances of distinctive appearance and, more specifically, it comprises adding to such an electrolyte a tannin-containing material; and it also comprises as a new material a caustic alkali battery electrolyte containing indicating means capable of undergoing visual change with a change in character of such electrolyte; all as more fully hereinafter set forth and as claimed.

This invention relates more particularly to the type of primary and secondary cells having an alkaline electrolyte, generally caustic soda, and negative and positive elements of copper oxid and zinc; but it is not restricted thereto, since it is applicable to any other cell using a caustic alkali electrolyte.

In the use of primary cells and batteries it is extremely desirable to be able to observe the course of action and approaching exhaustion in some way. Many efforts to accomplish this end have been tried; all proposing to take advantage of some change in an electrode. Sometimes the copper oxid is contained in a special container whereby its changing color can be observed from time to time. Various constructions and shapes of the negative or zinc electrode have also been tried and with good results in many cases. Generally a preferential attack on some portion of the electrode has been relied upon. While these methods, as stated, sometimes give good results, they involve changing one electrode or the other and do not permit using the best types of electrodes, chemically and mechanically considered. They are inconvenient.

In the present invention, I have materially improved upon the former means for determining the state of exhaustion by employing the third element of the cell, to wit, the solution. In this type of cell the electrolyte is alkaline, being generally a caustic soda solution. As the action of the cell goes on the solution of caustic soda gradually changes in character by solution of zinc oxid, forming zincate of soda. This change is, of course, proportional to the exhaustion of the cell; and it may be readily indicated by the use of various chemicals so that a glance shows the state of the cell. Various things may be added to the electrolyte in quantities insufficient to affect its action chemically or electrically which will, nevertheless, give a visual indication of the change in character of the electrolyte. Whatever substance is used, it is advantageously introduced at the time the battery is set up. An advantageous material for my purposes is tannin or tannic acid or various vegetable extracts containing the same. Tannic acid on solution in alkali forms "tannates" of more or less definite constitution and these bodies become dark colored by oxidation in the presence of excess of alkali. This is true not only of the material sold as tannin but of the wide variety of vegetable extracts containing tannins and glucosids. An extract of tea, for instance, behaves in this way.

When a zinc copper oxid cell is set up and to the alkaline electrolyte is added a little tannin or one vegetable extract or another, the liquid becomes dark colored but is not otherwise affected. Its normal action in the cell is in no way affected. But as the cell is used and becomes exhausted, the color disappears in the body of the liquid and is apparent only at the top. This change forms a useful indication of the action of the cell.

While the proportion of tannin to be used may be varied within wide limits without affecting the described action, I generally desire to use rather small amounts. The difference between say 1 per cent and 15 per cent is simply a difference in denseness or darkness in hue. The color is generally around a strong tea or chocolate color. I have used with good results from 5 to 10 parts by volume of a 1 per cent tannic acid solution in 400 to 450 parts of battery solution. The battery liquid is usually a caustic soda solution of 20° to 26° Baumé. With such a solution in one case, I employed 80 cc. of a 10 per cent tannic acid solution in 4288 cc. of electrolyte. This gave me a tea colored solution. As the cell was put into use and zinc dissolved in the soda, the solution gradually cleared as the cell approached exhaustion. Finally the dark portion of the solution was only at the top. Clearing goes on from the bottom upwards and with the electrolyte substantially exhausted, the colored layer in this instance was three quarters to one inch in thickness.

While I find it most convenient to add the tannic acid as a solution to the caustic soda solution when the battery is set up, the tannic acid in a dry form may be mixed with the proper proportion of caustic soda also in the dry state. Or, dry tannic acid may be mixed with the copper oxid of the negative element, either as such or as tannate of copper. Or the positive zinc may be painted with a solution of tannic acid.

A solution of tea, bark liquor, quebracho extract, etc. can be used in the same way as pure tannic acid and with the same results. It is even possible to use "leather findings". Log wood extract also gives a satisfactory indication.

Many other substances than tannin are capable of giving useful visual indications. For example, a solution of sodium phosphate added to the caustic soda electrolyte in small proportions gives a progressive clouding up of the solution and ultimate formation of crystals or a precipitate. Phenolphthalein in solution in the strong caustic soda gives relatively little color and this color deepens progressively as the caustic soda takes up zinc oxid.

What I claim is:

1. An electrolyte for battery use adapted to give a visible change through the effect of battery exhaustion.

2. An electrolyte solution containing tannic acid.

3. In a primary battery, an electrolyte solution adapted to develop a visible change through chemical changes therein incident to electrolysis.

4. In a battery, the combination of negative and positive elements and electrolyte, and a substance in the electrolyte giving a visible change through electro-chemical changes of the elements.

5. An electrolyte for battery use capable of chemical reaction whereby the color is altered in the electric action of the battery.

6. An electrolyte for battery use including a coloring substance capable of undergoing chemical reaction in the electrolytic action of the battery, such action causing a visible physical change in the electrolyte.

7. An electrolyte for battery use adapted to undergo visible change through the electrolytic action of the battery giving a different color.

8. The electrolytic method of visibly indicating the state of exhaustion of a battery which comprises the addition to the active elements of a substance capable of visibly changing the physical properties of the electrolyte coincident with the discharge of the battery.

9. In an electrolyte an added solution, which because of chemical reaction during the discharge of the battery is converted into a substance of different color.

10. An electrolyte for battery use comprising a solution which, by the electrolytic action of the battery is changed in color as the battery discharges so that the change in the color of the solution will serve as an indication of the discharge.

11. In an electrolyte a solution of a character which will form a solution of a different color upon chemical change due to the electrolytic action of the battery.

12. An electrolyte for battery use including a substance capable of chemical reaction to produce a different colored substance upon the electrolytic action of the battery.

13. An electrolyte capable through the discharge of the battery of being changed to a solution of different color.

14. In a galvanic cell, an electrolyte having a soluble capacity indicator.

15. In a galvanic cell, an electrolyte solution comprising a soluble compound alterable by electro-chemical action to physically indicate the electric conditions of the cell.

16. The method of physically indicating the electro-chemical conditions of a battery which comprises adding to the electrolyte a chemically active agent which will form with the electrolyte a soluble compound alterable by the passage of an electric current to form a visible capacity indicator.

17. In an electrolyte for batteries a solution of different color from the electrolyte and of a character to be acted upon by the chemicals formed in the discharge of the battery to form a different colored salt.

18. The electrolytic method of visibly indicating the unused capacity of a battery which comprises the addition to the active elements of a cell of a substance which will change the visible physical properties of the electrolyte in proportion to the rate of discharge.

19. An electrolyte for battery use capable of chemical reaction in the action of the battery whereby the color is altered.

20. An electrolyte for battery use including a coloring substance capable of chemical reaction in the action of the battery which action causes a visible physical change in the electrolyte.

21. An electrolyte for battery use adapted to be changed visibly in the action of the battery giving a substance of a different color.

22. The electrolytic method of visibly indicating the state of exhaustion of a battery which comprises the addition of the active elements of a substance capable of visibly changing the physical properties of the electrolyte coincident with the discharge of the battery.

In testimony whereof, I have hereunto affixed my signature.

MARTIN L. MARTUS.

Witnesses:
E. H. BECKER,
HARRY T. HUBERT.